ized Patent [19] [11] 4,185,670
Sartell, Jr. [45] Jan. 29, 1980

[54] PORTABLE BICYCLE TIRE AIR SYSTEM

[76] Inventor: Ripley B. Sartell, Jr., 1882 E. Cornell Dr., Tempe, Ariz. 85283

[21] Appl. No.: 959,613

[22] Filed: Nov. 13, 1978

[51] Int. Cl.² .............................. B65B 3/04; B62J 3/00
[52] U.S. Cl. ................................... 141/94; 116/137 R; 141/231; 141/388; 152/415; 280/289 R
[58] Field of Search ................... 116/2, 34 R, 137 R, 116/142 FP; 137/223, 227, 229, 231; 141/1, 38, 67, 94, 98, 231, 363, 375, 392, 388; 152/415, 416; 222/3; 280/289 R

[56] References Cited
U.S. PATENT DOCUMENTS

| | | | |
|---|---|---|---|
| 3,335,766 | 8/1967 | Winger | 141/38 |
| 3,459,218 | 8/1969 | Cranage | 116/137 R X |
| 3,670,690 | 6/1972 | Swanson | 116/142 FP X |
| 4,095,812 | 6/1978 | Rowe | 280/289 R |

Primary Examiner—Frederick R. Schmidt
Attorney, Agent, or Firm—Cahill, Sutton & Thomas

[57] ABSTRACT

A high pressure compressed air tank has an inlet and an inlet valve which is opened when a fitting of a service station air hose is pressed against the inlet. High pressure compressed air is then forced from the service station air hose into the tank. The inlet valve prevents compressed air from escaping from the tank. An outlet fitting connected to the tank has an outlet valve therein. The outlet fitting is pressed against the tire valve housing of a bicycle, causing the tire valve to open. High pressure compressed air from the tank is then forced into the bicycle tire, thereby inflating it. The tank is attached to a frame member of the bicycle by means of a quick-release bracket. An air horn operable by means of a button valve and a pressure gauge are attached to the high pressure air tank.

8 Claims, 7 Drawing Figures

U.S. Patent      Jan. 29, 1980      4,185,670
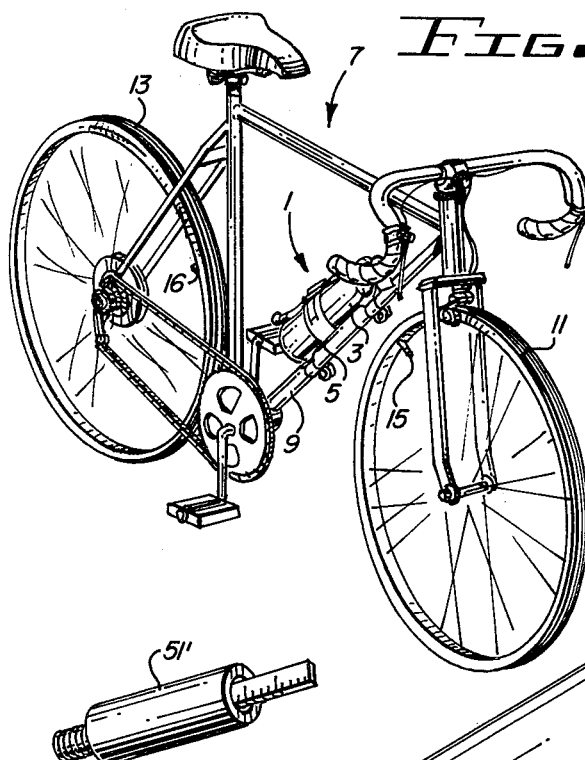
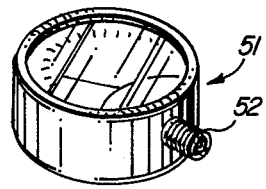
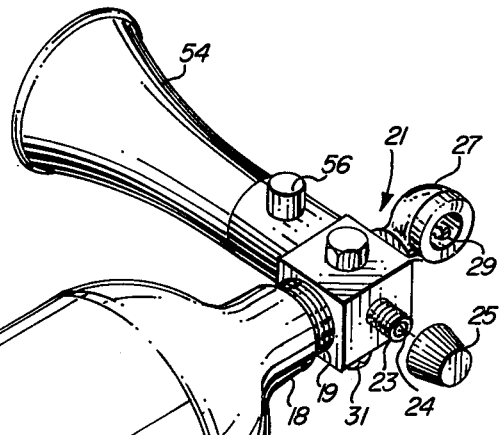
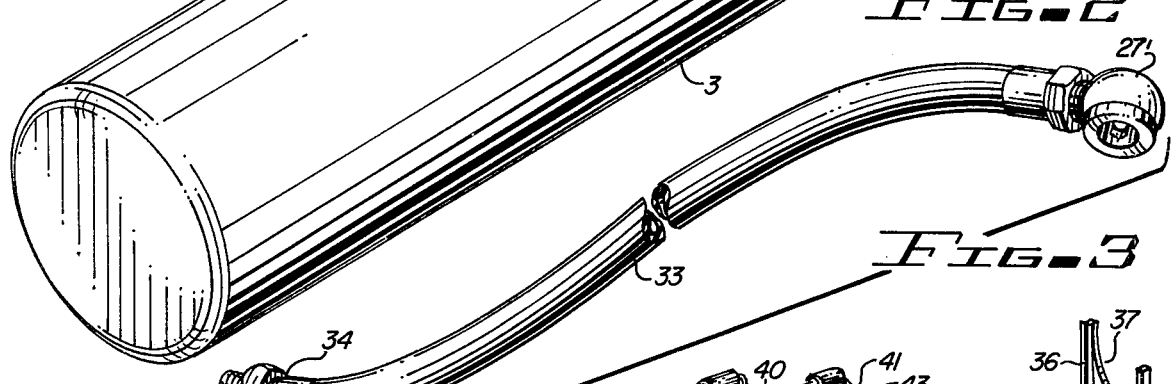
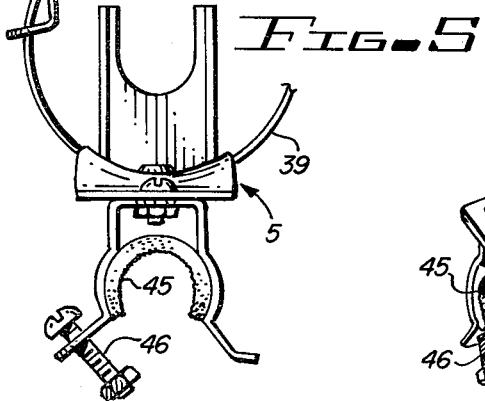
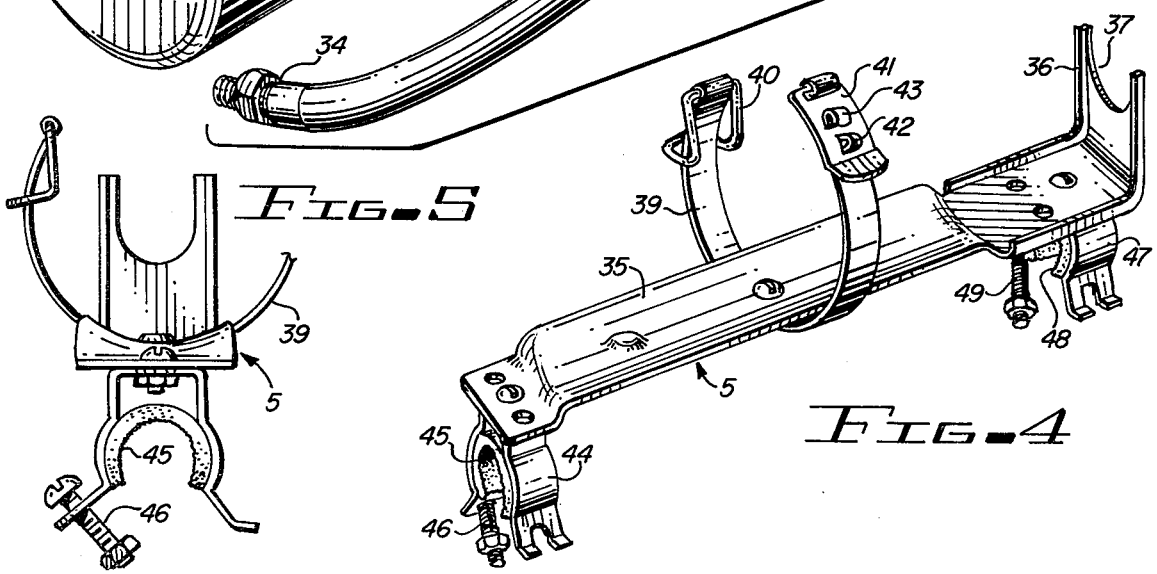

4,185,670

PORTABLE BICYCLE TIRE AIR SYSTEM

BACKGROUND OF THE INVENTION

1. Field of the Invention

The invention relates to tire inflating systems, and more particularly, to portable systems for inflating bicycle tires.

2. Description of the Prior Art

Low tire pressure is a frequent source of inconvenience and frustration for bicycle riders. Lighweight racing type bicycles require very high tire pressures of approximately 65 lbs. or more to minimize "drag" due to excessive flexing of underflated tires. Of course, a bicycle can be ridden with lower tire pressure, but underinflated tires create drag which increases sharply as tire inflation pressure is reduced. Consequently, a rider must pedal harder to travel at a particular speed if tire pressure is low. To bicycling enthusiasts who frequently ride considerable distances at rather high speeds, reduced tire inflation pressure which may be due to slow leaks is highly undesirable. The problem is accentuated by the fact that tires for racing type bicycles have a very low volume, so that very slight leaks can significantly reduce tire pressure. Such tires have very thin walls, and are quite susceptible to small punctures due to thorns and the like. The problem is further heightened by the fact that small portable tire pumps of the type which can be easily attached to a bicycle frame are virtually incapable of pumping a bicycle tire up to pressures as high as 65 lbs. when operated by bicycle riders of ordinary strength. The only types of manual bicycle pumps which are capable of pumping pressures of the necessary magnitude are heavy, expensive devices having long, small diameter cylinders and pistons. Such pumps cannot be conveniently carried on a bicycle. There is clearly an unmet need for a portable compressed air system which can be conveniently carried on a bicycle and utilized for inflating bicycle tires.

Accordingly, it is an object of the invention to provide a portable system for inflating tires, especially low volume, high pressure tires, such as bicycle tires for lightweight bicycles.

Another object of the invention is to provide a portable, refillable compressed air system which can be easily and conveniently carried on a bicycle and which can be quickly and easily utilized to inflate bicycle tires.

A hazzard frequently encountered by bicycles is that of motor vehicles which encroach on a bicyclist's right of way, obviously endangering the bicyclist. Although various bicycle horns have been devised, some of which are battery powered and are operated by means of a horn button and others of which have rubber bulbs which can be squeezed by the bicyclist to force air through a reed mechanism to produce a short, loud sound, none are both reliable and capable of producing a suitably loud and sustained blast to be sure of alerting a careless automobile driver, who may be in an automobile wherein all windows are rolled up and various noisy occasions, such as when radio and an air conditioning unit are operating and several passengers are talking loudly. There is therefore an unmet need for a horn capable of sustained loud sound blasts suitable for mounting on a bicycle. It is necessary that such a horn be acceptable to safety conscious bicycle riders in spite of its additional weight.

It is therefore another object of the invention to provide a horn suitable for attachment to a bicycle, which horn is capable of producing a loud, sustained blast of sound sufficient to alert unalert or distracted automobile drivers.

Yet another object of the invention is to provide a bicycle horn capable of producing a very loud, sustained blast of air, which horn is operable in conjunction with other accessories desirable to bicyclists in order to minimize the weight per desirable accessory function.

SUMMARY OF THE INVENTION

Briefly described, and in accordance with one embodiment thereof, the invention provides a portable compressed air system mountable on a vehicle for inflating the tires of the vehicle and for operating an air horn attached to the portable compressed air system. In the described embodiment of the invention, the vehicle is a bicycle having high pressure pneumatic tires. The system includes a high pressure tank which is releasably attached to a frame member of the bicycle by means of a quick release clamp. An adaptor having an inlet connected to the air cylinder provides an input valve for receiving air from a conventional service station air hose and preventing escape of compressed air in the tank. The adaptor includes an outlet connected to an outlet valve housing of the type which can be sealably engaged with a valve housing of a bicycle tire valve to open the bicycle tire valve. High pressure compressed air in the tank is then forced into the bicycle tire, thereby inflating it. An air horn operable by a button valve is attached to the adaptor. Additional accessories, such as an extension hose coupling the outlet valve to the adaptor and a gauge for indicating tank pressure can be connected to the adaptor.

BRIEF DESCRIPTION OF THE DRAWINGS

FIG. 1 is a perspective view of a bicycle having the portable tire air system of the present invention attached thereto.

FIG. 2 is a perspective view showing a high pressure compressed air tank, an adaptor, an inlet and outlet valves.

FIG. 3 discloses an accessory hose which can be connected to the adaptor of FIG. 2.

FIG. 3A discloses an accessory which can be attached to the adaptor of FIG. 2.

FIG. 4 is a perspective view of a quick release bracket utilized to attach the apparatus of FIG. 2 to the bicycle of FIG. 1.

FIG. 5 is an end view of the bracket of FIG. 4.

FIG. 6 discloses a gauge which can be connected to the adaptor of FIG. 2.

DESCRIPTION OF THE INVENTION

Referring now to the drawings, and particularly to FIG. 1, portable compressed air system 1 includes high pressure tank 3 and a bracket 5 for securely attaching high pressure tank 3 to frame member 9 of bicycle 7. As will become clear in the following description, high pressure compressed air stored in tank 3 can be utilized to conveniently inflate tires 11 and 13 of bicycle 7.

Referring now to FIG. 2, tank 3 has an enlarged cylindrical body and a relatively narrow neck 18. Neck 18 has a threaded portion 19 thereon. Tank 3 is preferably steel, and is of a design capable of safely storing gas having pressure of several hundred pounds per square inch. Adaptor 21 has a threaded hole therein for receiving threaded portion 19 of neck 18, whereby, adaptor 21 is tightly screwed onto neck 18 so as to avoid any loss of compressed air stored in tank 3.

Adaptor 21 has interior passages from its large threaded opening (which receives the threaded portion 19 of the neck of high pressure tank 3) to a plurality of smaller threaded openings. One of the smaller threaded openings has an inlet valve housing 23 threaded therein. Inlet valve housing 23 has an axial threaded hole 24 into which an ordinary tire valve core is tightly screwed. The valve core has a valve stem which can be depressed to open the valve. Tank 3 thus can be filled with high pressure compressed air at any automobile service station by placing an air hose fitting tightly over inlet valve housing 23 in such a manner as to depress the stem of the valve core, thereby opening the inlet valve and allowing high pressure air from the air hose to flow through inlet housing 23 into tank 3. When the air hose fitting is removed, the valve core closes, preventing escape of compressed air in tank 3. Valve cap 25 is then screwed on the exterior threads of valve stem housing 23 to prevent any loss of air through the inlet valve core, should the inlet valve core be defective.

Adaptor 21 has a second small threaded opening into which outlet valve housing 27 is tightly screwed. Outlet valve housing 27 includes an internal outlet valve (not shown) which can be actuated by valve stem depressor 29. Outlet valve housing 27 is of a well known type commonly used on air hoses at automobile service stations. If valve housing 27 is pressed over valve housing 15 of tires 11 in FIG. 1, valve stem depressor 29 depresses the valve stem of the valve core in valve housing 15, thereby opening the valve core and also opening the internal outlet valve in outlet valve housing 27. This permits high pressure compressed air in tank 3 to flow into tire 11, thereby inflating it. It should be noted that a gasket (not shown) contained in outlet housing 27 provides a seal against the rim of the valve housing 15. Further details of the above described valves are well known in the art, and need not be described herein. High pressure tanks such as tank 3 are also well known and readily available, and need not be described in further detail.

Adaptor 21 includes several other small threaded holes which are plugged by plugs, such as plug 31, as shown in FIG. 2. Plug 31 is tightly screwed in an unused threaded opening in adaptor 21 to prevent any loss of compressed air. However, various accessories can be attached to the unused threaded openings of adaptor 21. For example, a flexible hose 33, shown in FIG. 3, can be attached to one of the unused openings of adaptor 21 by removing the plug and tightly screwing threaded connector 31 attached to flexible hose 33 into the unused opening. An outlet valve 27', identical to outlet valve 27, is attached to the opposite end of flexible hose 33. This permits either the front tire 11 or rear tire 13 of bicycle 7 to be inflated without removing high pressure tank 3 from bracket 5.

Other accessories can be attached to unused outlets of adaptor 21. For example, pressure gauge 51 of FIG. 3A can be threaded into one of the unused outlets by means of threaded connector 52. The user can then easily determine at a glance whether high pressure tank 3 needs to be refilled with compressed air at a service station. An alternate type of gauge which may be used, designated by reference numeral 51', is shown in FIG. 6.

Referring again to FIG. 2, air horn 54 is rigidly attached to adaptor 21, as illustrated. A button valve 56 is contained in adaptor 21, which button valve can be depressed to operate air horn 56. Air horn 56 can be oriented at a right angle to the length of tank 3, as shown, or at any other convenient angle that does not interfere with pressing outlet fitting 27 over valve housing 15 or 16 of the tires of bicycle 1.

It should be noted that the button of button valve 56 is positioned such that a bicyclist can easily and quickly move his or her right hand from the right hand grip of the handlebar of bicycle 7 to depress horn valve button 56.

Referring now to FIGS. 4 and 5, bracket 5 includes a frame 35 contoured to conform to the cylindrical shape of tank 3. Neck 18 of high pressure tank 3 is supported by extension 36 of frame 35. Extension 36 has a semicircular cut 37 which supports neck 18 of tank 3. A metal strip 39 is attached to the under side of contoured frame 35 by means of a bolt and nut. Latch elements 40 and 41 are respectively hinged to the opposite ends of strap 39. Latch element 40 has a hook 43 into which the end of latch element 40 is placed. Latch element 41 is then pivoted about its hinged end to lie flat against strap 39, as shown in FIG. 4. This produces leverage which tightens strap 39 about high pressure tank 3, forcing neck 18 tightly against semicircular cut 37. A lock hasp 42 attached to strap 39 extends through a slot in latch element 41, as shown in FIG. 4. A padlock or other suitable locking device can be looped through hasp 42 to prevent theft of tank 3 and the elements attached thereto.

Clamps 44 and 47 are bolted or welded to the under side of contoured frame 35 to permit secure bolting of bracket 5 to frame member 9 of bicycle 7. Clamps 44 and 47 have flexible liners 45 and 48 disposed therein to provide semi-resilient attachment of bracket 5 to frame member 9 to avoid unduly rigid connection thereto and also to avoid damage to the finish of frame member 9. Bolts 46 and 49 are tightened to clamp bracket 5 to frame member 9.

It should be apparent that various modifications to the described structure can be made without departing from the spirit and scope of the invention. For example, various alternative brackets could be utilized to mount high pressure tank 3 to various portions of a bicycle. Similarly, alternative types of outlet valves, such as valves actuatable by a lever or button, could be utilized in place of the valve contained in housing 27. And, of course, it is not necessary that air system 1 be utilized only in conjunction with a bicycle. It could be utilized for motorcycles or other types of motor vehicles having relatively low volume tires and a need for a horn capable of producing a loud, sustained blast of sound.

I claim:

1. Portable compressed air apparatus attachable to a vehicle for inflating tires of a bicycle, said apparatus comprising in combination:
    a. a tank capable of safely storing compressed air at a high pressure;
    b. a quick release bracket securely clamped to a frame member of the bicycle for enabling a bicyclist to quickly and easily remove said tank from said bracket;
    c. an inlet valve for receiving high pressure compressed air from an automotive service station air hose, conducting said high pressure compressed air into said tank, and preventing said high pressure compressed air from escaping from said tank;
d. an outlet valve conveniently engageable with a valve of a tire of the bicycle, said outlet valve being operable to inflate the tire by allowing compressed air from said tank to be forced into the tire via the tire valve, and closable to prevent undesired escape of compressed air from said tank;
e. an air horn attached to said tank, said air horn including a manually operable valve for conducting compressed air from said tank into said air horn to cause said air horn to produce a loud, sustained blast of sound; and
f. adaptor means connecting said outlet valve and said inlet valve to a hole through a neck of said tank for conveying compressed air from said inlet valve into said tank and for conveying compressed air from said tank through said adaptor and out of said outlet valve.

2. The portable compressed air apparatus of claim 1 wherein said adaptor means includes a first opening sealably attached to the neck of said tank, a second opening sealably attached to said inlet valve, and a third opening sealably attached to said outlet valve, said adaptor means containing a continuous passage from said inlet and outlet valves to said hole through the neck of said tank.

3. The portable compressed air apparatus of claim 2 wherein said inlet valve includes a threaded valve housing having a valve core openable to permit said conducting of said high pressure air into said tank, and wherein said outlet valve includes a housing sealably engageable with a valve housing of a tire of said bicycle and a valve core openable to permit compressed air in said tank to be forced into a tire of said bicycle when said housing is sealably engaged with a valve housing of said bicycle tire.

4. The portable compressed air apparatus of claim 3 wherein said outlet valve housing is coupled to said adaptor means by a flexible hose.

5. The portable compressed air apparatus of claim 3 further including a gauge attached to said adaptor for indicating the pressure of compressed air in said tank.

6. The portable compressed air apparatus of claim 1 wherein said tank has a substantially cylindrical body.

7. Portable compressed air apparatus attachable to a bicycle for inflating tires of a bicycle, said apparatus comprising in combination:
a. a tank capable of safely storing compressed air at a high pressure;
b. a quick release bracket securely clamped to a frame member of the bicycle for enabling a cyclist to quickly and easily remove said tank from said bracket;
c. an inlet valve for receiving high pressure compressed air from an automotive service station air hose, conducting said high pressure compressed air into said tank, and preventing said high pressure compressed air from escaping from said tank;
d. an outlet valve conveniently engageable with a valve of a tire of the vehicle, said outlet valve being operable to inflate the tire by allowing compressed air from said tank to be forced into the tire via the tire valve, and closable to prevent undesired escape of compressed air from said tank;
e. an adaptor coupling said outlet valve and said inlet valve to a hole through a neck of said tank for conveying compressed air from said inlet valve into said tank and for conveying compressed air from said tank through said adaptor and out of said outlet valve, wherein said inlet valve includes a threaded valve housing having a valve core openable to permit said conducting of said high pressure air into said tank, wherein said outlet valve includes a housing sealably engageable with a valve housing of a tire of said bicycle and a valve core openable to permit compressed air in said tank to be forced into a tire of said bicycle when said housing is sealably engaged with a valve housing of said bicycle tire;
f. a flexible air hose coupling said outlet valve to said adaptor; and
g. a gauge attached to said adaptor for indicating the pressure of compressed air in said tank.

8. Portable compressed air apparatus attachable to a vehicle for inflating tires of the vehicle, said apparatus comprising in combination:
a. a tank capable of safely storing compressed air at a high pressure;
b. a quick release bracket securely clamped to a frame member of the vehicle for enabling a user to quickly and easily remove said tank from said bracket;
c. an inlet valve for receiving high pressure compressed air from an automotive service station air hose, conducting said high pressure compressed air into said tank, and preventing said high pressure compressed air from escaping from said tank;
d. an outlet valve conveniently engagable with a valve of a tire of the vehicle, said outlet valve being operable to inflate the tire by allowing compressed air from said tank to be forced into the tire via the tire valve, and closable to prevent undesired escape of compressed air from said tank;
e. an air horn attached to said tank, said air horn including a manually operable valve for conducting compressed air from said tank into said air horn to cause said air horn to produce a loud, sustained blast of sound;
f. a pressure gauge; and
g. an adaptor connecting said outlet valve, said inlet valve, said air horn, and said pressure gauge to a hole through a neck of said tank for conveying compressed air from said inlet valve into said tank and for conveying compressed air from said tank through said adaptor and out of said outlet valve, wherein said adaptor includes a first opening sealably attached to the neck of said tank, a second opening sealably attached to said inlet valve, and a third opening sealably attached to said outlet valve, said adaptor containing a continuous passage from said inlet and outlet valves to said hole through the neck of said tank, wherein said outlet valve housing is coupled to said adaptor by means of a flexible hose.

* * * * *